United States Patent Office 2,919,183
Patented Dec. 29, 1959

2,919,183

FERTILIZER SOLUTIONS

Ivan Christoffel, Hopewell, Va., assignor to Allied Chemical Corporation, a corporation of New York No Drawing. Application May 20, 1955
Serial No. 510,048

3 Claims. (Cl. 71—51)

For a period of several years there has been a trend in the fertilizer field toward the development of liquid compositions suitable for marketing and direct application to the soil with or without first diluting with water. Anhydrous liquid ammonia and ammoniacal solutions of fertilizer salts have commonly been marketed for this purpose. For this purpose the compositions must contain suitably high contents of the fertilizing elements for it to be economical to ship them in solution form, and should contain these elements in proper ratios to meet the food requirements of the growing plants. To these criteria must be added the requirement that the liquids have low enough salting out temperatures so that they may be stored, transported and applied to the soil, without these operations being interfered with by excessive deposition of solids from the solution or requiring unduly expensive, complicated precautions being taken to prevent solid deposition, or to re-dissolve solids which have deposited in the equipment used.

I have discovered certain liquid fertilizer compositions containing both nitrogen and phosphorus which, in large-scale testing of their suitability for distribution to the fertilizer trade, meet all of the necessary requirements for their successful production, distribution and use. The liquid fertilizers of my invention contain about 26% or more plant food (nitrogen and $P_2O_5$) in about equal proportions by weight. They do not salt out at temperatures of 5° C. and higher.

The liquid fertilizer compositions of my invention are solutions of ammonium phosphate having substantially the composition $(NH_4)_{1.6}H_{1.4}PO_4$ and ammonium nitrate amounting to 0.65 to 1.15 times the weight of the ammonium phosphate, in water amounting to 44% to 52% by weight of the solution. Despite the high solids content of the solutions, 48% to 56% by weight of total ammonium nitrate and ammonium phosphate, they have the desirably low salting out temperatures, not substantially above 5° C., which facilitate their storage, transportation and use. They contain desirable ratios of nitrogen and $P_2O_5$ in fertilizers for various applications; particularly desirable being those compositions in which the ammonium nitrate amounts to 1.05 to 1.15 times the weight of the ammonium phosphate, since they then contain substantially a 1/1 ratio by weight of N and $P_2O_5$. My preferred compositions contain substantially 25.4%–25.8% ammonium nitrate, 22.9%–23.3% ammonium phosphate of the foregoing composition and 50.9%–51.7% water. They contain about 26% total N and $P_2O_5$ and have salting out temperatures no higher than 0° C.

An important and characteristic feature of this invention is my discovery of the surprisingly high solubility in water of a mixture of an ammonium phosphate of the particular composition defined above, and ammonium nitrate in the above proportions. For example, a solution of diammonium phosphate $(NH_4)_2HPO_4$ in water containing a total of 30% plant food has a salting out temperature of 17° C. As ammonium nitrate, diammonium phosphate and water are added in amounts maintaining the total plant food content of N and $P_2O_5$ at 30%, the salting out temperatures of the solutions sharply rise by about 60 centigrade degrees when the ammonium nitrate amounts to 0.7 times the weight of the ammonium phosphate. Starting with a solution of ammonium phosphate having the composition $(NH_4)_{1.6}H_{1.4}PO_4$ containing a total of 30% plant food and salting out at —5° C., I have discovered that as ammonium nitrate, ammonium phosphate of this composition and water are added, the salting out temperature of the solutions containing 30% total plant food does not undergo the precipitate rise shown by the diammonium phosphate solutions. The salting out temperatures of these solutions increase only about 9 centigrade degrees when the ammonium nitrate amounts to 0.7 times the weight of the ammonium phosphate. Thus, I found a limited field in which the compositions of my invention may be prepared having suitably low salting out temperatures, high content of ammonium phosphate and nitrate (48% to 56% by weight) and containing desirable ratios of nitrogen to $P_2O_5$.

The compositions to which my invention is directed may be prepared in various manners. For example, monoammonium phosphate and diammonium phosphate in the weight ratio of 0.581/1 and ammonium nitrate amounting to 0.65 to 1.15 parts by weight of the total ammonium phosphate are dissolved in water to give a solution containing 48% to 56% by weight of total ammonium phosphate and ammonium nitrate. Another method is to absorb ammonia in a phosphoric acid solution until 1.6 mols of ammonia have been absorbed for every 1 mol of $H_3PO_4$. To this ammonium phosphate solution the required amount of ammonium nitrate is added, either in the form of a solution or solid ammonium nitrate, with the needed adjustment in the water content of the final product to within the range 44% to 52% water.

Any of the foregoing or other obviously appropriate methods may be used for the preparation of the following compositions which are illustrative of the invention.

*Composition 1.*—A solution with a salting out temperature of —2° C. is prepared having the following weight composition: 22.94% $(NH_4)_{1.6}H_{1.4}PO_4$, 25.41% $NH_4NO_3$ and 51.65% water. Total plant food content of this composition is 26% N and $P_2O_5$ in a weight ratio of 1/1. Ratio of ammonium nitrate to ammonium phosphate is 1.11/1.

*Composition 2.*—A solution with a salting out temperature of 4.5° C. is prepared having the following weight composition: 31.4% $(NH_4)_{1.6}H_{1.4}PO_4$, 23.4% $NH_4NO_3$ and 45.2% water. Total plant food content of this composition is 30% N and $P_2O_5$ in a weight ratio of .776/1. Ratio of ammonium nitrate to ammonium phosphate is .745/1.

*Composition 3.*—A solution of 23.3%

$(NH_4)_{1.7}H_{1.3}PO_4$ 24.7% $NH_4NO_3$ and 52% water has a salting out temperature of 5.8° C., which is substantially the maximum in salting out temperatures of the compositions of my invention. It contains a total plant food content of 26% in about equal proportions by weight of nitrogen and $P_2O_5$.

I claim:
1. A fertilizer solution composed of ammonium phosphate having substantially the composition

$(NH_4)_{1.6}H_{1.4}PO_4$ and ammonium nitrate amounting to 0.65 to 1.15 times the weight of the ammonium phosphate in water amounting to 44% to 52% by weight of the solution, and having a salting out temperature not substantially above 5° C.

2. The fertilizer solution of claim 1 in which the ammonium nitrate amounts to 1.05 to 1.15 times the weight of the ammonium phosphate.

3. A fertilizer solution having substantially the composition (by weight) of 22.9% to 23.3% ammonium phosphate of the composition $(NH_4)_{1.6}H_{1.4}PO_4$, 25.4% to 25.8% ammonium nitrate and 50.9% to 51.7% water, containing about 26% total N and $P_2O_5$ and having a salting out temperature no higher than 0° C.

References Cited in the file of this patent

UNITED STATES PATENTS

| 1,514,912 | Klugh | Nov. 11, 1924 |
| 1,785,375 | Buchanan | Dec. 16, 1930 |
| 1,999,026 | Tramm et al. | Apr. 23, 1935 |
| 2,022,673 | Kniskern | Dec. 3, 1935 |
| 2,061,191 | Foss et al. | Nov. 17, 1936 |
| 2,814,556 | Christoffel | Nov. 26, 1957 |

FOREIGN PATENTS

| 302,148 | Great Britain | Aug. 15, 1929 |
| 396,092 | Great Britain | July 27, 1933 |